United States Patent
Poschel et al.

(10) Patent No.: US 10,581,825 B2
(45) Date of Patent: Mar. 3, 2020

(54) INTEGRATING SENSITIVE DATA FROM A DATA PROVIDER INTO INSTANCES OF THIRD-PARTY APPLICATIONS EXECUTED ON USER DEVICES

(71) Applicant: EQUIFAX, INC., Atlanta, GA (US)

(72) Inventors: Timothy G. Poschel, Roswell, GA (US); Ryan Petersen, Atlanta, GA (US); Josh Hanson, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 194 days.

(21) Appl. No.: 15/882,293

(22) Filed: Jan. 29, 2018

(65) Prior Publication Data

US 2018/0219846 A1 Aug. 2, 2018

Related U.S. Application Data

(60) Provisional application No. 62/451,204, filed on Jan. 27, 2017.

(51) Int. Cl.
*H04L 29/06* (2006.01)
*H04L 29/08* (2006.01)

(52) U.S. Cl.
CPC .......... *H04L 63/08* (2013.01); *H04L 63/0807* (2013.01); *H04L 63/10* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 10,120,734 | B1* | 11/2018 | Doraiswamy | G06F 21/44 |
| 2015/0310202 | A1* | 10/2015 | Sondhi | G06F 21/41 |
| | | | | 726/8 |
| 2017/0359346 | A1* | 12/2017 | Parab | H04L 67/306 |
| 2018/0004972 | A1* | 1/2018 | Ruggiero | G06F 21/6245 |

OTHER PUBLICATIONS

"Experian Connect API—Embed Credit Check Functionality with our Experian API", Copyright 2018, available online at: http://www.experian.com/connect/api/#tabs-1, accessed from the internet on Jun. 28, 2018, 2 pages.

* cited by examiner

*Primary Examiner* — Fatoumata Traore
(74) *Attorney, Agent, or Firm* — Kilpatrick Townsend & Stockton LLP

(57) ABSTRACT

Certain aspects involve facilitating the integration of sensitive data from a data provider into an instance of a web-based, third-party application. For example, a data provider service can receive an authentication API call from a third-party system. The authentication API call can include a user identifier and a request for an access token usable by a web-based interface of the third-party system. The data provider service can generate an access token for the third-party system from which the authentication API call is received. The data provider service can subsequently receive, from the user device, a feature API call including the access token and a feature request for sensitive data. The data provider service can generate output data specific to the user identified by the access token included in the feature API call. The data provider service can provide the output to the user device via the web-based interface.

20 Claims, 8 Drawing Sheets

```
POST /v1/enrollment?format=json HTTP/1.1
Host: https://sandbox-api.consumer.equifax.com/saas
Cache-Control: no-cache
Authorization: Bearer 4c98508d-5f40-4b79-b251-
b873214d94a5
Content-Type: application/json {
  "referenceId": "REF-001",
  "subject": {
    "type": "usperson",
    "currentAddress": {
      "city": "Nowhere",
      "postalCode": "30005",
      "state": "ID",
      "street1": "123 Main Street",
      "street2": null
    },
    "dateOfBirth": 221720400000,
    "email": "none@equifax.com",
    "firstName": "Jane",
    "homePhone": {
      "areaCode": 555,
      "exchange": 867,
      "extension": 5309
    },
    "lastName": "Smith",
    "middleName": null,
    "mobilePhone": null,
    "previousAddress": null,
    "socialSecurityNumber": "123456789",
  }
}
```

```
{
  "type": "success",
  "request": {
    "referenceId": "REF-001",
    "subject": {
      "type": "usperson",
      "currentAddress": {
        "city": "Nowhere",
        "postalCode": "30005",
        "state": "ID",
        "street1": "123 Main Street",
        "street2": null
      },
      "dateOfBirth": 221720400000,
      "email": "none@equifax.com",
      "firstName": "Jane",
      "homePhone": {
        "areaCode": 555,
        "exchange": 867,
        "extension": 5309
      },
      "lastName": "Smith",
      "middleName": null,
      "mobilePhone": null,
      "previousAddress": null,
      "socialSecurityNumber": "123456789"
    }
  },
  "responseMessage": "SUCCESS",
  "status": "COMPLETE",
  "subjectId": "8b9ad1bf-820b-417a-92f5-50ea7364ac60",
  "enrollmentId": "1018",
  "responseCode": 200
}
```

POST /oauth/token HTTP/1.1
Host: https://sandbox-api.consumer.equifax.com/saas
Cache-Control: no-cache
Content-Type: application/x-www-form-urlencoded scope=read&grant_type=jwt-bearer&api_key=mock_delivery&client_assertion=eyJhbGciOiJSUzI1NiIsImN0eSI6Imp3dCIsImVuYyI6IkEyNTZHQ00ifQ.ZXIKaGNHbExaWGtpT2IKMFpYTjBTMlY1U0dGeVpHTnZaR1ZrSWI3aVkzUjVjam9pYW5kdEpldGI2V3huSWpvaVpHSjhaXdpWlc1aklqb2lRVEVxTmtrRFRTlkuLjJ
UWTFHNUpJdE14SG5adkOuTEpiMFUwcjdVTVZmamV4STRybEVBNVpOdzRIdWVNcTFKbXFCb2dyamVHRGtmX0MyU3piVW9SUVI1RjNB
WWxBVTJJR2N2bFF4bXEYlF4ZTl0TVlQREIjUkpnWWdtY2ZaYS1PdWxzZbUhGQWhQeWdYa05WVUdETEI3Z29BZ3NFSTJ3ejVHRm1YMTi
zOWlabllkeIFZWGZrZWt5VW9nZHhDWjFGcijiNOhDZXRfbDJnNTRJcWRUYI9wSEZfdHRnU0J4WERLU1ZYNGlJQm9sMHdDdklWZy5pMU5v
WGdQV0UyvF9xcnlnODhOGGJR_XLk1ORA6eMpZLcFKi0omYRVETXExwl-
Armuz7BOXwStoEsaCGYrTHNN4c3owuyNT5Keurh9UICl0kNtZywK2XowVlb_4Ut0QOd-7ES2WZ-2647Ql-
b5JdqcuHTFlfkmq70bGConU9Tz5FRT5QVqfLAlqDzH_MnFft0C7hedsWbWWzkhBJRfc3oH3uTplMhaBwO4ZomNMJG1Utm0tVq7kPAXnx6s
Q24gyVAedwC8GSdx-r4MV_Bk5yuhnLb890A1z55Y5KIKBmB5aEaRvEMjAel99KuqDHKwiXbKl4D__s9hkRTUa1CwUqMRRtj2u-
fm3m8ib3RJqakqePCgEreVVv7Q

{
"access_token": "3eea1b91-1ced-4a9c-ab63-
a42f547920ff",
"token_type": "bearer",
"refresh_token": "03a7d466-3df1-4919-9906-
f6fc31ec3f75",
"expires_in": 2999,
"scope": "read"
}

```
GET /v1/creditScore/latest?format=json HTTP/1.1
Host: https://sandbox-api.consumer.equifax.com/saas
Authorization: Bearer 3eea1b91-1ced-4a9c-ab63-a42f547920ff
Cache-Control: no-cache
```

FIG. 9

```
{
  "providerViews": [
    {
      "provider": "VANTAGE",
      "score": 780,
      "scoreRanges": [
        {
          "low": 280,
          "high": 559,
          "name": "Poor"
        },
        {
          "low": 560,
          "high": 659,
          "name": "Fair"
        },
        {
          "low": 660,
          "high": 724,
          "name": "Good"
        },
        {
          "low": 725,
          "high": 759,
          "name": "Very Good"
        },
        {
          "low": 760,
          "high": 850,
          "name": "Excellent"
        }
      ],
      ...
```

```
      ...
      "loanRiskRanges": [
        {
          "low": 280,
          "high": 599,
          "name": "Very High Risk"
        },
        {
          "low": 600,
          "high": 660,
          "name": "High Risk"
        },
        {
          "low": 661,
          "high": 715,
          "name": "Medium Risk"
        },
        {
          "low": 716,
          "high": 747,
          "name": "Low Risk"
        },
        {
          "low": 748,
          "high": 850,
          "name": "Very Low Risk"
        }
      ],
      ...
```

```
      "scoreReasons": [
        {
          "code": "P04",
          "description": "",
          "creditScoreFactorEffect": "HELPING"
        },
        {
          "code": "P48",
          "description": "",
          "creditScoreFactorEffect": "HELPING"
        },
        {
          "code": "P55",
          "description": "",
          "creditScoreFactorEffect": "HELPING"
        },
        {
          "code": "P98",
          "description": "",
          "creditScoreFactorEffect": "HELPING"
        }
      ]
    }
  ],
  "id": "janesmith-efx-001",
  "scoreType": "US_EFX",
  "generatedDate": 1453853919167
}
```

FIG. 10

INTEGRATING SENSITIVE DATA FROM A DATA PROVIDER INTO INSTANCES OF THIRD-PARTY APPLICATIONS EXECUTED ON USER DEVICES

RELATED APPLICATIONS

The present disclosure claims priority to U.S. provisional application Ser. No. 62/451,204, titled "Integrating Sensitive Data from a Data Provider into Instances of Third-Party Applications Executed on User Devices" and filed on Jan. 27, 2017, which is incorporated by reference herein in its entirety.

TECHNICAL FIELD

This disclosure relates generally to the field of information security, and more specifically relates to authenticating information requests via integration of secured information into a third-party application.

BACKGROUND

A consumer may request, via an online service, secured information that is available from a data provider service separate from the online service. The online service may verify the consumer's identity via an authentication process. In addition, the data service provider may provide the requested secure information. The online service may include a feature for displaying the requested secure information, and additional features for displaying other information available from the online service for the authenticated consumer.

To display the requested secure information, the online service may need to store a copy of the requested secure information. However, the online service may not be able to securely store the information. For example, computing systems for the online service may improve security by not accessing the requested secure information, thus reducing a number of computing systems that access the secure information. In addition, local laws or regulations may prohibit the online service from accessing the secure information.

Alternatively, to display the requested secure information, the online service may direct the consumer to the separate data provider service. A conventional technique for handling the consumer's request includes passing the request to the data provider service, and the requested secure information may be displayed by the data provider service. However, the data provider service may need to re-verify the consumer's identity via an additional authentication process, which may frustrate or confuse the consumer. In addition, the data provider service may not have access to the additional features of the online service, disrupting the consumer's experience and providing an incomplete response to the consumer's request. Because of this, conventional techniques for directing the consumer to the data provider service may be inadequate for handling the consumer's request for secured information via the online service.

SUMMARY

According to certain implementations, a telecommunications network server includes a data provider service and stored data records with information about one or more users. The telecommunications network server receives, from a third-party system, an authentication call to an application program interface ("API") of the data provider service. For example, the authentication API call includes a user identifier and a request for an access token usable by a web-based interface of the third-party system. Based on the authentication API call, the telecommunications network server determines that the identified user is authorized, and generates an access token to provide to the third-party system. In some aspects, the third-party system provides the access token to a user device associated with the user, such as via a web-based interface of the third-party system.

In some implementations, the telecommunications network server receives, from the user device, a feature API call. For example, the feature API call includes the access token (or information based on the access token) and a request for one or more features (e.g., display of sensitive data). Based on the feature API call, the telecommunications network server generates output data specific to the user (e.g., identified by the access token), and provides the output to the user device, such as via the web-based interface of the third-party system.

These illustrative aspects are mentioned not to limit or define the disclosure, but to provide examples to aid understanding thereof. Additional aspects are discussed in the Detailed Description, and further description is provided there.

DESCRIPTION OF THE DRAWINGS

Features, aspects, and advantages of the present disclosure are better understood when the following Detailed Description is read with reference to the accompanying drawings, where:

FIG. 4 is a diagram depicting an example of an enrollment request transmitted by a third-party system after a successful authentication of a user, according to certain aspects;

FIG. 5 is a diagram depicting an example of a message, including a status message and a user identifier, that is transmitted from a data provider service to a third-party system, according to certain aspects;

FIG. 7 is a diagram depicting an example of an authentication request transmitted by a third-party system to a data provider service, according to certain aspects;

FIG. 8 is a diagram depicting an example of a response to an authentication request, the response transmitted by a data provider service to a third-party system, according to certain aspects;

FIG. 9 is a diagram depicting an example of a request using an access token, transmitted by an application on a user device to a data provider service, according to certain aspects;

FIG. 10 is a diagram depicting an example of a response to a request with an access token, transmitted by a data provider service to an application on a user device, according to certain aspects.

DETAILED DESCRIPTION

Figure 1:
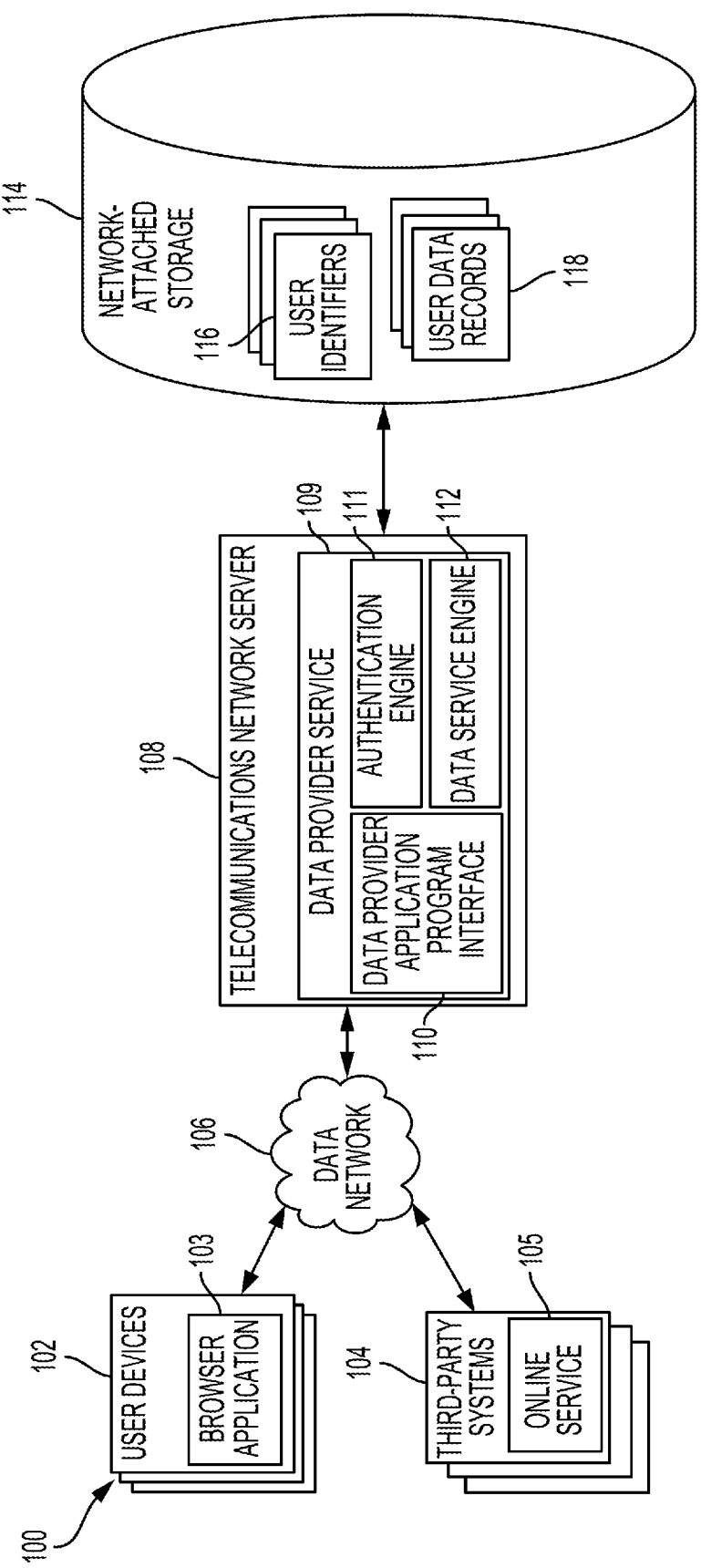
FIG. 1 is a block diagram depicting an example of a data service system for integrating sensitive data from a data provider into instances of third-party applications executed on a user device, according to certain aspects.

Certain aspects and features of the present disclosure relate to a data provider system that can facilitate the integration of sensitive data from a data provider into an instance of a web-based, third-party application that is executed on a user device (e.g., a user's computing device that accesses the third-party application from a web browser). This facilitation can involve a sequence of communications among the data provider system, a third-party system that provides the web-based application, and a user device that is independent of the data provider system and the third-party system. For example, a user can access, on the user device, an online service via a browser that executes an instance of the third party's web-based application. As the user accesses the online service, the data provider system can verify the identity of the user via communications between the data provider system and the third-party system. Based on verifying the user's identity from these communications with the third-party system, the data provider system can facilitate communications with the user's device that allow sensitive data maintained by the data provider system to be integrated with a web-based interface controlled by the third-party system. The sensitive data can be integrated with the third-party system's web-based interface at the user's device, without the sensitive data being provided to the third-party system.

In some aspects, the data provider system can include a telecommunications network server that can communicate through a network port to a telecommunications network that can include the Internet, cellular network, WiFi networks, near-field communication networks, other networks, or any combination of these. The telecommunications network server can execute a data provider service that manages, via a data provider API, communications with the user device and third-party systems that are separate from the server and from each other. The telecommunications network server can communicate with the third-party system to verify that a particular user has been authenticated and is authorized to access certain features of the data provider service.

Based on this verification, the telecommunications network server can access a data structure (e.g., a database) in which is stored user personally identifiable information ("PII") and other sensitive information about the user, and can provide PII or data derived from PII (e.g., an analytical report about a user) to a computing device associated with the user without providing the PII or derived data to the third-party system. For example, the telecommunications network server may generate and provide an access token that is usable by a browser application on the user device for requesting, via the data provider API, PII or derived data directly from the data provider service. The requested PII or derived data can be delivered from the data provider service to the browser application via the data provider API.

In some aspects, the data provider system allows sensitive data about individuals or other entities to be securely delivered to a browser application, which is executed on a user device, that accesses an interface for an online service that is provided by a third-party system. The sensitive data can be delivered to the browser application and presented in the third-party-controlled interface without the sensitive data being stored or otherwise maintained by the third-party system. The integration of this sensitive data with the third-party interface can allow a third-party system to control how the sensitive data is displayed to end users (e.g., via the web browser executed on a user device) without requiring the third-party system to access the sensitive data from the data provider service.

Certain aspects can improve the security of electronically stored, sensitive data by reducing the number of computing systems that access the sensitive data (e.g., by reducing opportunities to compromise a computing system). In addition, integrating the sensitive data with the third-party system's web-based interface allows the third party to respond to additional requests made by the user in the same web-based interface. For example, the user may view other information from the third party and the sensitive data in the same interface, without needing to provide additional authentication details (e.g., logging into another system).

These illustrative examples are given to introduce the reader to the general subject matter discussed here and are not intended to limit the scope of the disclosed concepts. The following sections describe various additional features and examples with reference to the drawings in which like numerals indicate like elements, but should not be used to limit the present disclosure.

Example of an Operating Environment for Performing Browser Integration Operations Referring now to the drawings, FIG. 1 depicts an example of a data service system 100 that is usable for integrating sensitive data from a data provider into instances of third-party applications (e.g., interfaces of third-party web applications) that are executed on a user device. FIG. 1 depicts examples of hardware components of a data service system 100 according to some aspects. The data service system 100 is a specialized computing system that may be used for performing large amounts of browser integration operations using a large number of computer processing cycles.

The numbers of devices depicted in FIG. 1 are provided for illustrative purposes. Different numbers of devices may be used. For example, while certain devices or systems (e.g., a telecommunications network server 108, a network-attached storage 114, etc.) are shown as single devices in FIG. 1, multiple devices may instead be used to implement these devices or systems (e.g., a cloud or grid-based telecommunications network server system, a group of network-attached storage devices, etc.).

The data service system 100 can include one or more user devices 102. The user devices 102 may include client devices that can communicate with the telecommunications network server 108. For example, the user devices 102 may send requests to the telecommunications network server 108 for data to be retrieved or processed. The user devices 102 may interact with the telecommunications network server 108 via one or more data networks 106.

The user devices 102 may also interact with third-party systems 104. For example, a user device 102 can execute a browser application 103 and thereby establish a communication session with a third-party system 104 to access an online service 105 provide by the third-party system 104. The browser application 103 can be any suitable application for establishing such a communication session. In some aspects, a browser application 103 can be a web browser that can access any website, including multiple websites used for hosting multiple, independent online services 105. In additional or alternative aspects, a browser application 103 can be an application that is limited to accessing a particular online service 105, such as a mobile application provided by a third-party system 104 for accessing its online service 105. In these various aspects, interfaces used by online services 105 can be generated and controlled by the third-party systems 104 that provide the online services 105.

The data service system 100 can include one or more third-party systems 104. Each third-party system 104 may include one or more third-party systems (e.g., computing devices or groups of computing devices), such as individual servers or groups of servers operating in a distributed manner. A third-party system 104 can communicate with the telecommunications network server 108. For example, third-party systems 104 may send data to the telecommunications network server 108 to be processed or may send signals to the telecommunications network server 108 to control different aspects of the data service system 100 or the data it is processing. The third-party systems 104 may interact with the telecommunications network server 108 via one or more data networks 106. The third-party systems 104 may also interact with the user devices 102 via one or more data networks 106 to facilitate electronic transactions between users of the user devices 102 and online services 105 that are hosted by, provided by, or otherwise associated with the third-party systems 104.

Each communication within the data service system 100 (e.g., between user devices 102 and the telecommunications network server 108, between third-party systems 104 and the telecommunications network server 108, etc.) may occur over one or more data networks 106. A data network 106 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 106.

A data network 106 may include network computers, sensors, databases, or other devices that may transmit or otherwise provide data to telecommunications network server 108. For example, a data network 106 may include local area network devices, such as routers, hubs, switches, or other computer networking devices. The data networks 106 can be incorporated entirely within (or can include) an intranet, an extranet, or a combination thereof. In one example, communications between two or more systems or devices can be achieved by a secure communications protocol, such as secure Hypertext Transfer Protocol ("HTTP") communications that use secure sockets layer ("SSL") or transport layer security ("TLS"). In addition, data or transactional details communicated among the various computing devices may be encrypted.

The data service system 100 can also include a telecommunications network server 108. The telecommunications network server 108 may be a specialized computer or other machine that processes the data received within the data service system 100. The telecommunications network server 108 may include one or more other systems. For example, the telecommunications network server 108 may include a database system for accessing the network-attached storage 114, a communications grid, or both. A communications grid may be a grid-based computing system for processing large amounts of data.

The telecommunications network server 108 can include one or more processing devices that execute program code, such as a data provider service 109 that includes (or is in communication with) a data provider API 110, an authentication engine 111, and a data service engine 112. The program code is stored on a non-transitory computer-readable medium.

The data provider service 109 can communicate, via the data provider API 110, with user devices 102, third-party systems 104, or some combination thereof via encrypted communication. Data exchanged between the data provider API 110 and other systems can have any suitable format. An example of a suitable format is JavaScript Object Notation ("JSON") format. In one example, the data provider service 109 can communicate a set of confidential information using an encrypted, signed JSON Web Token ("JWT"). For example, the data provider service 109 can configure the telecommunications network server 108 to receive a JWT, transmit a JWT, or both to communicate with the third-party systems 104 and the user devices 102. A JWT can include one or more key-value pairs in a JSON format.

The authentication engine 111 can execute a set of operations for authenticating a user of a user device 102, issuing access tokens for use by an authenticated user of a user device 102, or some combination thereof. The authentication engine 111 can configure the telecommunications network server 108 to communicate data with one or more third-party systems 104 regarding the authentication of the user, as described in further detail herein.

The authentication engine 111 can execute a set of operations for using one or more features that are available from the data provider service 109. In some aspects, the data service engine 112 can identify certain features to be used by a user device 102, a third-party system 104, or both based on a scope of a desired operation to be performed in response to a request from the user device 102 or the third-party system 104. Examples of scopes, which are types of operations that can be requested by a third-party system 104 or a user device 102, include enrollment, fulfillment, delivery, and proxy delivery. In some cases, the data service engine 112 can prohibit or modify an operation related to a feature that is outside the scope of the request. For example, if the third-party system 104 is authorized to access features within an enrollment scope, and requests access to a fulfillment feature included within a fulfillment scope, the data service engine 112 can prohibit operations related to the fulfillment feature, based on the fulfillment feature being outside of the enrollment scope. In addition, the data provider service 109 can perform additional operations responsive to receiving a request for a feature outside of a scope, such as requesting new authentication information, providing an error message, or terminating a session with the requesting device.

Enrollment is the process by which a third-party system 104 communicates with the data provider service 109 to allow users to access features provided by the data provider service 109. An "enrollment" scope can be used in an API call to enroll/cancel users for features available from the data provider service 109 (e.g., a feature for generating a credit score, a feature for generating or retrieving a credit report, etc.). Enrollment requests can involve communications between the telecommunications network server 108 and a third-party system 104.

A "fulfillment" scope can be used in an API call to request fulfillment of features for users. Fulfillment requests can involve communications between the telecommunications network server 108 and a user device 102. For example, a user can request that the data provider service 109 generate a new credit score by using a user device 102 to transmit, via a browser interface provided by the online service 105, a fulfillment request to the telecommunications network server 108.

A "delivery" scope can be used in an API call to request delivery of features for users. Delivery requests can involve communications between the telecommunications network server 108 and a user device 102. For example, a user can request that the data provider service 109 retrieve and provide an existing credit score (e.g., a credit score generated in response to a previous fulfillment request) by using a user device 102 to transmit, via a browser interface provided by the online service 105, a delivery request to the telecommunications network server 108.

A "proxy delivery" scope can be used in an API call to request delivery of features to a proxy device or a proxy entity on behalf of a given user. Proxy delivery requests can involve communications between the telecommunications network server 108 and a user device 102 that is a proxy device (e.g., a computing device that is not used by the enrolled user and that is performing some operation on behalf of the enrolled user). For example, a user can request that the data provider service 109 retrieve and provide an existing credit score (e.g., a credit score generated in response to a previous fulfillment request) to a proxy entity by using a proxy device to transmit, via a browser interface provided by the online service 105, a proxy delivery request to the telecommunications network server 108. In some cases, the user can authorize a proxy entity to perform operations on behalf of the user using a proxy device. For example, the user can call customer support to request assistance, and authorize the customer service representative to act as a proxy entity to complete the request.

The data service system 100 may also include one or more network-attached storage 114. The network-attached storage 114 may store a variety of different types of data organized in a variety of different ways and from a variety of different sources. For example, the network-attached storage 114 may include storage other than primary storage located within telecommunications network server 108 that is directly accessible by processors located therein. In some aspects, the network-attached storage 114 may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The network-attached storage 114 can include memory devices for storing user identifiers 116 and user data records 118. One or more of the user identifiers 116 and user data records 118 can be received by a telecommunications network server 108 via a data network 106, generated by the telecommunications network server 108 based on communications with user devices 102, generated by the telecommunications network server 108 based on communications with third-party systems 104, or some combination thereof.

Each user identifier 116 can include identification data (e.g., numerical data, alphanumeric data, or some other suitable set of data) that corresponds to a particular user device 102 or a particular user of a user device 102. The telecommunications network server 108 can generate or otherwise obtain a user identifier 116 for a particular user (or user device) and transmit the user identifier 116 to a third-party system 104 for storage on a non-transitory computer-readable medium that is accessible to the third-party system 104. In browser integration operations, the authentication engine 111 can match copies of user identifiers 116, which are received from third-party systems 104 via one or more data networks 106, to stored user identifiers 116 and thereby verify the identities of certain users.

The user data records 118 can include sensitive data about users or other information about particular users. Examples of sensitive data include PII, credit data, confidential information, etc. In some aspects, information from the user data records 118 can be processed by the data service engine 112 to generate derived data about a user (e.g., risk assessments, credit scores, etc.).

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Examples of Browser Integration Operations

The following examples of browser integration operations are provided for illustrative purposes. These illustrative examples involve, for example, sensitive data about individuals or other entities, such as data selected or derived from the user data records 118, to be securely delivered to a browser application 103, which is executed on a user device 102, that executes an instance of a web-based application that is provided by a third-party system 104 (e.g., a web-based application for accessing an online service 105). Executing an instance of the web-based application of can include presenting a webpage or other interface that is generated by the third-party system 104. The browser application 103, which is executed on a user device 102, that accesses a web-based application of an online service 105 that is provided by a third-party system 104. Delivery of the sensitive data to a browser application 103 can be performed without the sensitive data being stored or otherwise maintained by a third-party system 104. These browser integration operations can allow a third-party system 104 to control how the sensitive data from the data provider service 109 is displayed to users of an online service 105 that is provided by the third-party system 104 without requiring the third-party system 104 to access the sensitive data from the data provider service 109.

Figure 2:
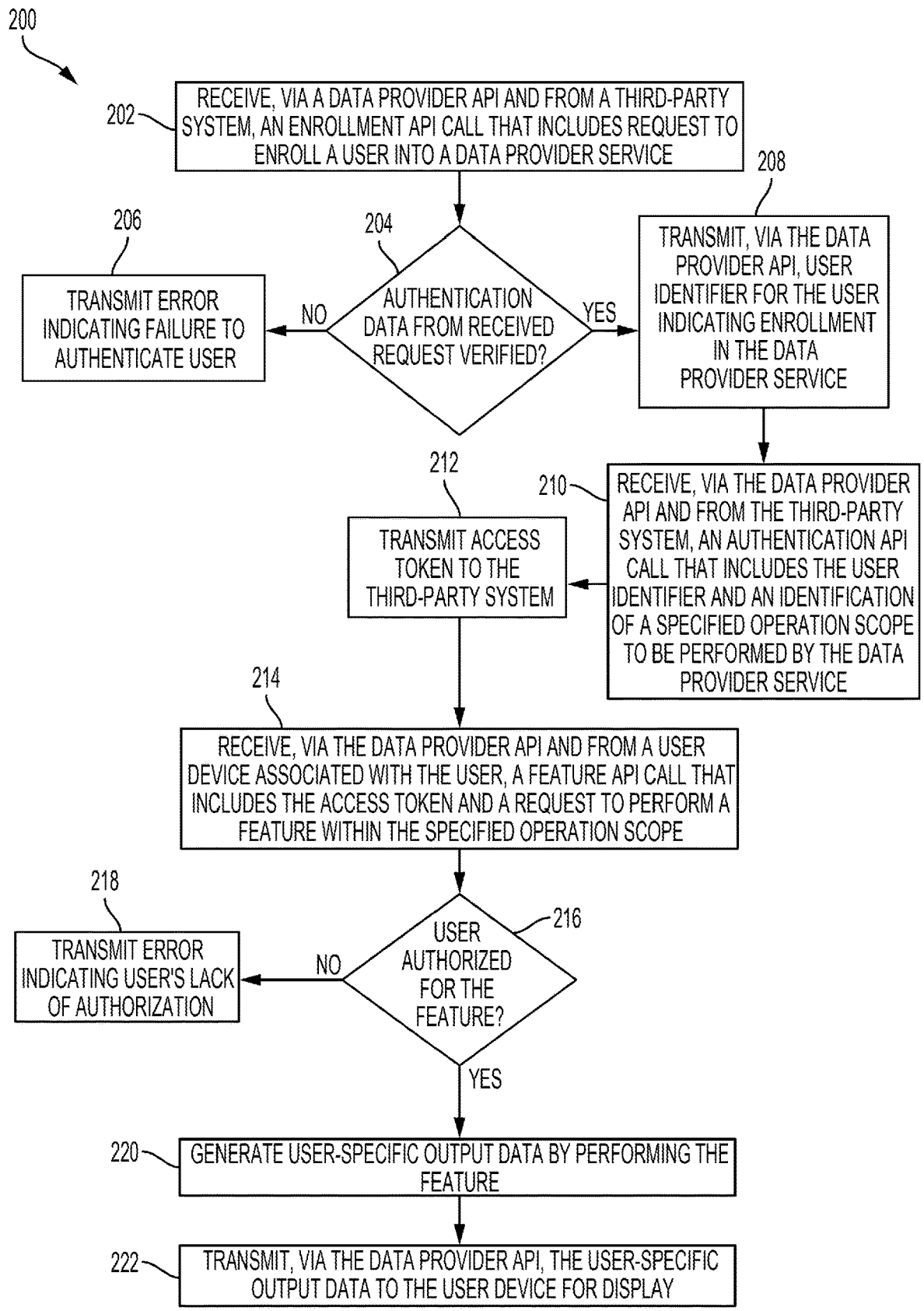
FIG. 2 is a flow chart depicting an example of a method for integrating sensitive data from a data provider service with a web-based application of a third-party online service via a browser application of a user device, according to certain aspects.

FIG. 2 is a flow chart depicting an example of a method 200 for integrating sensitive data from a data provider service with a web-based application of a third-party online service via a browser application of a user device. For illustrative purposes, the method 200 is described with reference to the implementation depicted in FIG. 1 and various other examples described herein. But other implementations are possible.

The method 200 can include receiving, via a data provider API and from a third-party system, an enrollment API call that includes a request to enroll a user into a data provider service, as depicted in block 202. Suitable program code of the data provider service 109 (e.g., the data provider API and the authentication engine 111) can be executed by one or more suitable processing devices to implement block 202. The telecommunications network server 108 can receive a communication that includes the enrollment API call via a network communications port or other suitable network interface device. The enrollment API call can be formatted and addressed in a manner that is compliant with the data provider API 110. For example, the enrollment API call can be addressed to an enrollment endpoint of the data provider API 110, where the enrollment endpoint is a logical endpoint for receiving enrollment requests from third-party systems 104. Examples of such API calls involving enrollment are described herein with respect to FIG. 3.

An enrollment API call can include data that is used by the data provider service 109 to enroll a particular user into the data provider service 109 and thereby authorize a user to access one or more data-processing features available from the data provider service 109. In some aspects, the enrollment API call can include authentication data (e.g., PII, answers to questions about the user provided from the data provider service 109 to an online service 105, etc.) that is usable by the data provider service 109 for verifying the identity of a user. Valid authentication data can match user data stored in one or more user data records 118 for a particular user.

For example, an online session can be established between a user device 102 and one or more third-party systems 104 via the Internet or another data network 106. The session can allow a user device 102 to communicate with the third-party system 104 and thereby conduct one or more electronic transactions involving a browser application 103 executed by the user device 102 and an online service 105 that is hosted by (or otherwise associated with) the third-party system 104. The online service 105 can provide, via an interface presented by the browser application 103, one or more options for enrolling a user of the user device 102 in the data provider service 109. The third-party system 104 can receive, from the user device 102, a selection of an option associated with enrolling the user. The third-party system 104 can transmit, based on this selection, a request to the telecommunications network server 108 to perform one or more operations for enrolling the user.

The method 200 can also include determining whether authentication data received with the request has been verified, as depicted in block 204. The authentication engine 111 can be executed by one or more suitable processing devices of the telecommunications network server 108 to implement block 204. For example, the authentication engine 111 can obtain, from the enrollment API call, information that identifies a user that is described by one or more of the user data records 118. The authentication engine 111 can use the obtained information to retrieve one or more user data records 118 that include data describing the user. The authentication engine 111 can compare data in the obtained user data records 118 to the authentication data included in (or otherwise obtained from) the enrollment API call. If the comparison results in a match, the authentication engine 111 can verify the received authentication data. If the comparison does not result in a match, the authentication engine 111 cannot verify the received authentication data.

If the authentication engine 111 cannot verify the received authentication data, the method 200 can include transmitting, to the third-party system, an error indicating a failure to authenticate the user as depicted in block 206. The data provider service 109 can be executed by one or more suitable processing devices of the telecommunications network server 108 to implement block 206. For example, the authentication engine 111 can generate a message indicating that the authentication data cannot be verified. The message can be formatted for transmission via the data provider API 110. The data provider service 109 can use the data provider API 110 to configure the telecommunications network server 108 for transmitting, to a third-party system 104 that submitted a request to enroll the user, the error message via a network communication port of the telecommunications network server 108.

In some aspects, the method 200 can terminate at block 206. In other aspects, the data provider service 109 can prompt the third-party system 104 to attempt re-authentication of the user. For example, the online service 105 provided by the third-party system 104 can prompt the user to correct erroneously entered authentication data (e.g., correction of PII entered by the user) or to enter alternative authentication data (e.g., answer to alternative questions used for knowledge-based authentication of the user). The method 200 can return to block 204 if new authentication data is received by the data provider service 109 from the third-party system 104.

If the authentication engine 111 successfully verifies the received authentication data, the method 200 can include transmitting, via the data provider API and to the third-party system, a user identifier for the user, thereby indicating that the user has been enrolled in the data provider service, as depicted in block 208. The data provider service 109 can be executed by one or more suitable processing devices of the telecommunications network server 108 to implement block 208. For example, the authentication engine 111 can generate a user identifier 116 and a message indicating a successful verification of the authentication data. The message can be formatted for transmission via the data provider API 110. The data provider service 109 can use the data provider API 110 to configure the telecommunications network server 108 for transmitting, to a third-party system 104 that submitted a request to enroll the user, the message and the user identifier 116 via a network communication port of the telecommunications network server 108.

The method 200 can also include receiving, via the data provider API and from the third-party system, an authentication API call that includes the user identifier and an identification of a specified operation scope to be performed by the data provider service, as depicted in block 210. The data provider service 109 can be executed by one or more suitable processing devices of the telecommunications network server 108 to implement block 210. For example, the authentication API call can be formatted and addressed in a manner that is compliant with the data provider API 110. The authentication API call can be addressed to an authentication endpoint of the data provider API 110, where the authentication endpoint is a logical endpoint for receiving authentication requests from third-party systems 104. Examples of such API calls involving authentication are described herein with respect to FIG. 3.

The method 200 can also include transmitting, to the third-party system, an access token enabling a browser application executed at a user device to request the specified operation, as depicted in block 212. The authentication engine 111 can be executed by one or more suitable processing devices of the telecommunications network server 108 to implement block 212. For example, the authentication engine 111 can generate an access token. The data provider service 109 can use the data provider API 110 to configure the telecommunications network server 108 for transmitting, to a third-party system 104 that requested the access token, the access token via a network communication port of the telecommunications network server 108. Examples of generating and transmitting an access token are described herein with respect to FIG. 3.

The method 200 can also include receiving, via the data provider API and from a user device associated with the user, a feature API call that includes the access token and a request to perform a feature within the specified operation scope, as depicted in block 214. The data provider service 109 can be executed by one or more suitable processing devices of the telecommunications network server 108 to implement block 214. For example, the telecommunications network server 108 can receive a message via the data provider API 110 that requests a performance of a feature of the data provider service 109. The message (i.e., the feature API call) can be formatted and addressed in a manner that is compliant with the data provider API 110. The feature API call can be addressed to a feature endpoint of the data provider API 110, where the feature endpoint is a logical endpoint for receiving authentication requests from third-party systems 104. Examples of such API calls involving requests to perform certain features of the data provider service 109 are described herein with respect to FIG. 3.

The method 200 can also include determining if the user is authorized for the requested feature, as depicted in block 216. The data provider service 109 can be executed by one or more suitable processing devices of the telecommunications network server 108 to implement block 216. For example, the data provider service 109 can identify a particular user identifier 116 that is associated with the received access token. The data provider service 109 can also identify enrolled features that are associated with the user identifier 116. The data provider service 109 can determine if the requested feature is included within the set of enrolled features for the user identifier 116. If the requested feature is included within the set of enrolled features for the user identifier 116, the user is authorized for the requested feature. If the requested feature is not included within the set of enrolled features for the user identifier 116, the user lacks authorization for the requested feature.

If the user is not authorized for the requested feature, the method 200 can also include transmitting, to the user device, an error message indicating the user's lack of authorization, as depicted in block 218. The data provider service 109 can be executed by one or more suitable processing devices of the telecommunications network server 108 to implement block 218. For example, the data provider service 109 can use the data provider API 110 to configure the telecommunications network server 108 for transmitting, to a user device 102 that requested the feature, the error message via a network communication port of the telecommunications network server 108.

If the user is authorized for the specified operation, the method 200 can also include generating user-specific output data by performing the requested feature, as depicted in block 220. The data service engine 112 can be executed by one or more suitable processing devices of the telecommunications network server 108 to implement block 220. For example, the data service engine 112 can perform one or more operations that are included within the requested feature (e.g., generating a credit report, computing a credit score, retrieving an existing credit report or score, etc.). Data from one or more user data records 118 associated with the user identifier 116 is provided as input to these operations. Performing these operations with the data from the user data records 118 generates the user-specific output data (i.e., a generated or retrieved credit report or credit score for a particular user).

The method 200 can also include transmitting the user-specific output data to the user device for display, as depicted in block 222. The data service engine 112 can be executed by one or more suitable processing devices of the telecommunications network server 108 to implement block 222. For example, the data provider service 109 can use the data provider API 110 to configure the telecommunications network server 108 for transmitting, to a user device 102 that requested the feature, the user-specific output data via a network communication port of the telecommunications network server 108.

Figure 3:
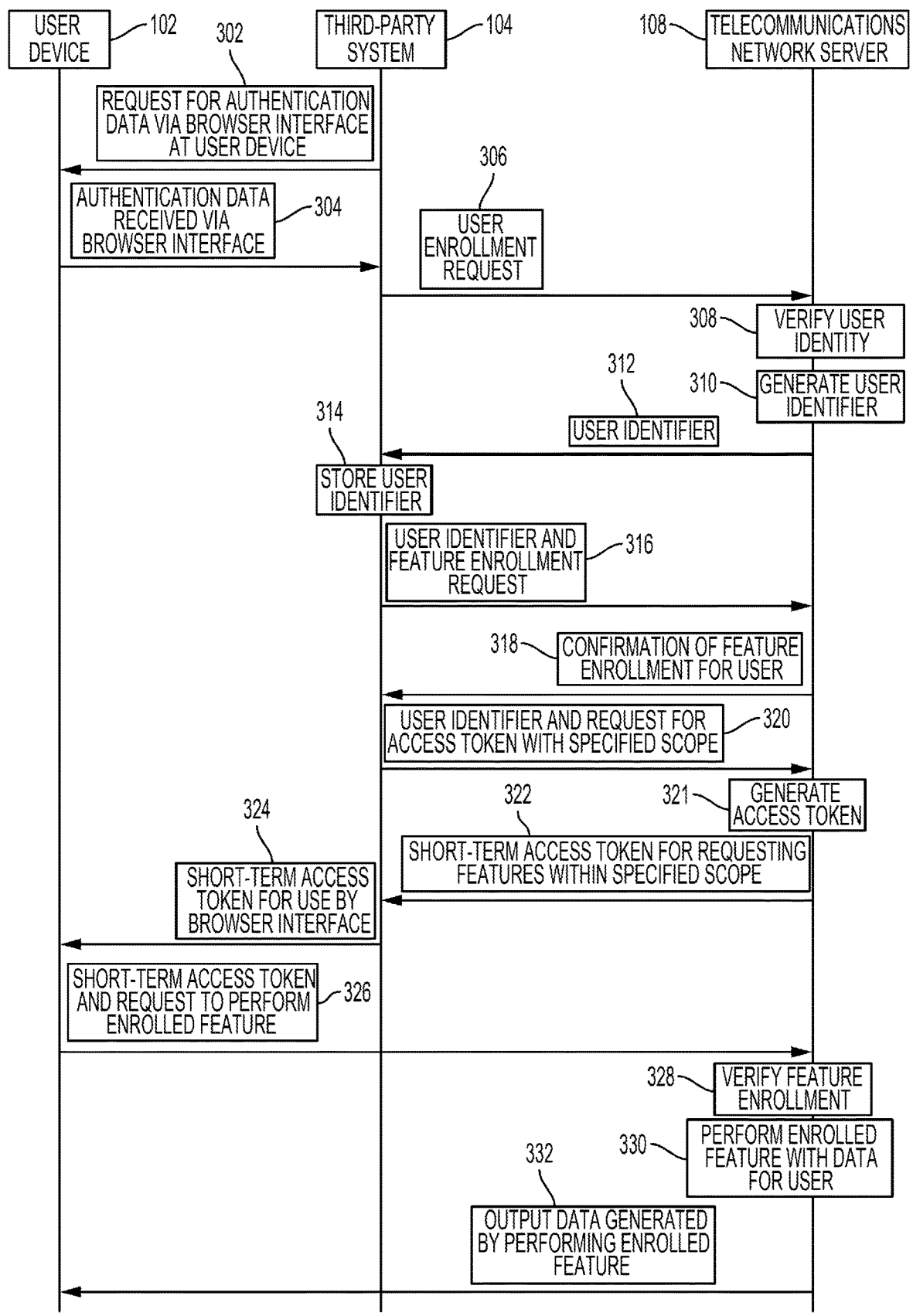
FIG. 3 is a diagram depicting an example of a data flow in which a user is enrolled in a data provider service and accesses an enrolled feature of the data provider service via a browser application executed at a user device, according to certain aspects.

FIG. 3 depicts an example of a data flow among a user device 102, a third-party system 104, and a telecommunications network server 108 in which a user is enrolled in the data provider service 109 and accesses an enrolled feature of the data provider service 109 via a browser application executed at the user device 102. In some aspects, certain operations from the data flow depicted in FIG. 3 can be used to implement one or more operations of the method 200.

In this example, the third-party system 104 can transmit, via a data network and to a user device 102, a communication 302 that includes a request for authentication data to be entered via a browser interface at the user device 102. For example, the browser interface can be generated by an online service 105, which is hosted or otherwise provided by the third-party system 104. The online service 105 can solicit authentication data for a user via the browser interface.

In some aspects, the type of authentication data is specified by the data provider service 109 using communications between the telecommunications network server 108 and the third-party system 104. For instance, an online service 105 can use knowledge-based authentication to authenticate a user of the user device 102. The knowledge-based authentication can involve presenting one or more questions at the user device 102 via a browser interface provided by the online service 105. The questions can solicit information about the user that is known to the user and that is stored in one or more user data records 118 that are accessible to the telecommunications network server 108. In some aspects, the third-party system 104 can transmit an API call to the data provider API 110 that requests a set of questions to be presented to the user via the browser interface provided by the online service 105. The communication 302 depicted in FIG. 3 can include the set of questions.

The third-party system 104 can receive authentication data from the user device 102 via a communication 304. The communication 304 can be generated by a user entering the requested authentication data (e.g., the answers to questions used in knowledge-based authentication) via the browser interface provided by the online service 105 and selecting an option in the browser interface to transmit the authentication data to the third-party system 104.

The third-party system 104 can transmit a communication 306 to the telecommunications network server 108 after receiving the authentication data. The communication 306 can include a user enrollment request as well as the authentication data. In operation 308, the telecommunications network server 108 can execute the authentication engine 111 or other suitable software and thereby verify the user identity. For example, the telecommunications network server 108 can compare the authentication data to information that is stored in one or more user data records 118 that are accessible to the telecommunications network server 108.

Enrollment is the process by which a third-party system 104 communicates with the data provider service 109 to allow users to access features provided by the data provider service 109. For example, enrolling a new user can involve the third-party system 104 sending a POST request with user credentials (e.g., using JSON in the body of the request) to a suitable logical endpoint of the data provider API 110. The enrollment request can be transmitted by the third-party system 104 to the data provider service 109 after a successful authentication operation has been performed and an access token provided for purposes of enrollment has been transmitted from the data provider service 109 to the third-party system 104. An example of such a request 400 is depicted in FIG. 4.

In one example, the header of the enrollment request (e.g., an API call to the data provider API 110) can include two fields: "Bearer" and "Content-Type." The "Bearer" field can have the value of the access token received from the data provider service 109 as the result of an authentication operation. The "Content-Type" can be "application/json." The body of the enrollment request can include contains suitably formatted information (e.g., JSON) on the new user being enrolled. Table 1, provided below, is an example of information that can be used to generate an API call for enrolling a new user.

to a combination of the user and the third-party system 104. For example, the telecommunications network server 108 can generate a first user identifier 116 for a particular user in response to an enrollment request from a first third-party system 104 and can generate a second, different user identifier 116 for the same user in response to an enrollment request from a second third-party system 104. The first third-party system 104 may be unable to use the second user identifier 116 and the second third-party system 104 may be unable to use the first user identifier 116.

The telecommunications network server 108 can transmit the generated user identifier to the third-party system 104 via a communication 312. For instance, the data provider service 109 can respond with a suitably formatted message (e.g., JSON, XML, etc.) that includes a status message and a user identifier 116 for the newly enrolled user. An example of such a request 500 is depicted in FIG. 5.

Returning to FIG. 3, the third-party system 104 can execute operation 314, which stores the received user identifier in a data structure on a non-transitory computer-readable medium that is accessible to the third-party system. The third-party system 104 can associate the user identifier provided by the telecommunications network server 108 with one or more other identifiers used by the third-party system 104 (e.g., a username provided by the online service 105 associated with the third-party system 104, a hardware identifier for the user device 102 associated with the user, etc.). In this manner, the third-party system 104 can transmit the user identifier to the telecommunications network server 108 in subsequent communications on behalf of the user.

The third-party system 104 can communicate with the telecommunications network server 108 to enroll a particu-

TABLE 1

| Type | Parameter | Purpose |
| --- | --- | --- |
| Required | referenceId | Used by the third-party system 104 to track API calls made to the data provider API 110. |
|  | subject.type | This can be, for example, "usperson." |
|  | subject.firstName | The first name of the user being enrolled. |
|  | subject.lastName | The last name of the user being enrolled. |
|  | subject.socialSecurityNumber | The social security number of the user being enrolled. |
|  | subject.dateOfBirth | The date of birth of the user being enrolled in milliseconds since the epoch. |
|  | subject.currentAddress | The current address of the user encoded as, for example, a JSON object with five fields:<br>city: the new user's current city<br>postalCode: the new user's current postalCode<br>state: the new user's current state<br>street1: the first line of new user's current street address<br>street2: the second line of the new user's current street address |
| Optional | subject.middleName | The middle name of the user being enrolled. |
|  | subject.previousAddress | The previous address of the user encoded as, for example, a JSON object with five fields: city, postalCode, state, street1, street2. |
|  | subject.email | The e-mail address of the user being enrolled. |
|  | subject.homePhone | The home phone number of the user being enrolled encoded as, for example, a JSON object with three fields:<br>areaCode: the 3-digit area code<br>exchange: the 3-digit exchange number<br>extension: the 4-digit extension number |
|  | subject.mobilePhone | The home phone number of the user being enrolled encoded as, for example a JSON object with three fields: areaCode, exchange, extension. |

Returning to FIG. 3, if the telecommunications network server 108 verifies the user's identity at operation 308, the telecommunications network server 108 can generate a user identifier at operation 310. The user identifier can be specific lar user, who is associated with the stored user identifier, in one or more features provided by the data provider service 109. Enrolling a user in a feature can involve specifying that a user corresponding to a particular user identifier 116 is authorized to access the feature provided by the data provider service 109. The availability of features can vary based on which third-party system 104 is accessing the data provider service 109.

To add a feature for a user, the third-party system 104 can transmit a suitable communication 316 to the data provider service 109. The communication 316 can include the user identifier from operations 310 and 314 as well as a feature enrollment request. The communication 316 can be (or include) an API call to the data provider API 110, such as a GET request directed to a suitable logical endpoint of the data provider API 110 (e.g., a "/v1/enrollment/{{useridentifier}}/features/{{feature code}}" endpoint). In some aspects, the third-party system 104 can request that a particular user be dis-enrolled from one or more features by transmitting another API call to the data provider API 110, such as a DELETE request directed to a suitable logical endpoint of the data provider API 110 (e.g., a "/v1/enrollment/{{useridentifier} }/features/{{feature code}}" endpoint).

If the feature is available to the third-party system 104, the data provider service 109 can enroll the user in the particular feature. For example, the telecommunications network server 108 can update a data structure in which the user identifier is stored to create an association between the user identifier and the requested feature. The telecommunications network server 108 can transmit a responsive communication 318 to the third-party system 104. The responsive communication 318 can include a confirmation that the user has been enrolled in the requested feature.

After a user has been successfully enrolled in the data provider service 109 and one or more features of the data provider service 109, the telecommunications network server 108 can communicate with both the third-party system 104 and the user device 102 to perform browser integration operations. In these browser integration operations, data specific to a particular user is provided to a user device 102 within a browser interface or other user interface controlled by the online service 105 associated with the third-party system 104.

The browser integration operations can involve using the data provider API 110 to authenticate entities (e.g., a user of a user device 102, an entity using a third-party system 104, etc.) via any suitable protocol (e.g., OAUTH2). For example, the data provider service 109 can generate and transmit an OAuth token to a third-party system 104 in response to an authentication request received from the third-party system 104, such as the communication 316 or a different authentication request that may precede an enrollment request. The authentication request can include a JWT having an intended scope of operations to be performed by the data provider service 109 on behalf of a user of the user device 102. The JWT can be generated and transmitted by the online service 105 on behalf of a user for operations requiring authentication of the user.

For example, the third-party system 104 can transmit a communication 320 to the telecommunications network server 108. The communication 320 can include the user identifier from operations 310 and 314, a request for an access token, and a desired scope of operation (e.g., fulfillment, delivery, etc.) for the access token. The communication 320 can be (or include) an API call to the data provider API 110.

Figure 6:
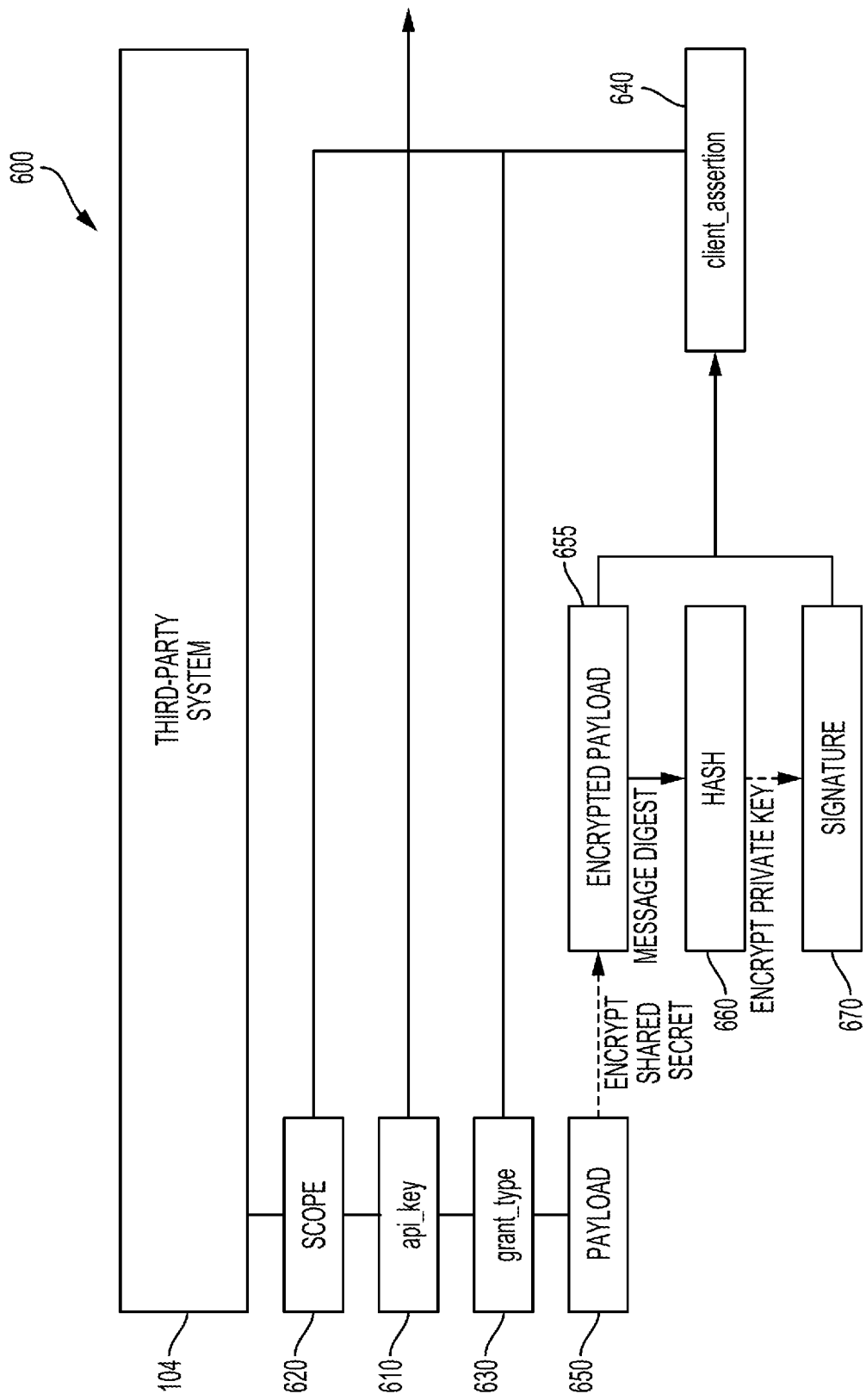
FIG. 6 is a diagram depicting an example of a data flow in which a request for authentication is generated, according to certain aspects.

An example of the communication 320 is a POST request to an /oauth/token endpoint of the data provider API 110. FIG. 6 illustrates an example of a logical flow 600 for generating a POST request used for authentication. The logical flow 600 includes selecting, generating, or otherwise obtaining data for parameters such as the scope of the authentication request, the API key for the authentication request, the grant type for the authentication request, and the client assertion for the authentication request.

In some aspects, the "api_key" parameter, such as the api_key parameter 610, is of the format <third-party ID>_<scope>, where the "third-party ID" is an identifier of a given third-party system 104 that is used by the data provider service 109, where the identifier is assigned to the third-party system 104 by the data provider service 109. A "scope" parameter, such as the scope parameter 620, can identify the type of action that is being requested from the data provider API 110 (e.g., enrollment, fulfillment, delivery, or proxy delivery). A "grant_type" parameter, such as the grant_type parameter 630, can be set to "jwt-bearer." The api_key parameter 610 can identify a specific third-party identifier that is assigned by the data provider service 109 to a particular third-party system 104 for purposes of accessing the data provider API 110.

A "client_assertion" parameter, such as client_assertion parameter 640, can include data notifying the data provider service 109 of the user for which data will be provided from the data provider service 109 via the data provider API 110. In some aspects, this data for the client_assertion parameter 640 can be an encrypted JWT. Additionally or alternatively, the client_assertion parameter 640 can include a payload, such as payload 650, that is encrypted. For example, the payload 650 can be encrypted to generate encrypted payload 655, and the encrypted payload 655 can be hashed, such as using hash 660, and additionally encrypted using a signature 670. The JWT can be signed on behalf of the third-party system 104. The JWT can be encrypted using a shared secret or other symmetric key that is specific to a given third-party system 104. In some aspects, the data provider service 109 can generate the shared secret or other symmetric key for a particular third-party system 104, update a data structure (e.g., a database) to associate the shared secret or other symmetric key with that third-party system 104, and transmit the shared secret or other symmetric key to that third-party system 104. Using a shared secret or other key that is specific to a given third-party system 104, a signature for the third-party system 104, or both can ensure that access to the data provider API 110 is restricted to authorized third-party systems 104 as well as users serviced by online services 105 that are provided by the authorized third-party systems 104.

An example of a POST request 700 used for authentication is depicted in FIG. 7. This example includes encrypted data for the "client_assertion" parameter, such as the client_assertion parameter 640 described in regards to FIG. 6. A third-party system 104 can generate a client_assertion by constructing an encrypted JWT. A JWT, which is defined using the open standard RFC 7519, can enable secure communication of data in JSON objects. This data in the JWT can be verified and trusted because the JWT is digitally signed. In some aspects, JWTs communicated between the data provider service 109 and a third-party system 104 can be signed using a public/private key pair using, for example, the RSA cryptosystem. The JWTs can also be encrypted using the JSON Web Encryption ("JWE") standard. JWE represents encrypted content using JSON-based data structures. Cryptographic algorithms and identifiers for use with this specification are described in the separate JSON Web Algorithms ("JWA") specification and IANA registries defined by that specification. Related digital signature and MAC capabilities are described in the separate JSON Web Signature ("JWS") specification.

In one example, the one or more types of information provided in Table 2 can be used to generate a JWT.

TABLE 2

| Type | Component | Description |
|---|---|---|
| Keys | Signing Private Key | A signing private key that is unique to a particular third-party system 104 and that is used to create a JWS component of the JWT. The JWS can be generated by encrypting a hash of the encrypted JWT payload.<br>In some aspects, a given third-party system 104 can create public and private keys (e.g., using the RSA X509 system), export the public key (e.g., as a DER Base64 Encoded X509 Certificate) and provide the exported public key to the data provider service 109. |
| | Symmetric Key | This key (also known as the shared secret) is unique to each third-party system 104. This key is used to encrypt the JWT payload via JWE. |
| Payload | Scope | Specifies the type of action that is being requested of the data provider API 110. In some aspects, this value can indicate one of the four scopes mentioned above (e.g., enrollment, fulfillment, delivery, or proxy delivery). |
| | Issuer | Specifies the third-party system 104 that is issuing the JWT. In some aspects, this parameter includes a third-party identifier assigned by the data provider service 109 to a particular third-party system 104. |
| | Subject | This parameter can have the form <api_key>:<User identifier>. The data for this parameter can indicate the third-party system 104 that is making the request, the scope of the request, and an identifier of an enrolled user that is associated with the request.<br>In some aspects, the format of this parameter can vary. For example, if a user has not yet been enrolled in the data provider service 109, no user identifier may yet be available. For an enrollment request, this parameter can have the form <api_key>:<api_key>. |
| | Subject Impersonator | Indicates, for proxy delivery requests, who is requesting delivery on behalf of the enrolled user. |
| | Expiration In Minutes | Indicates the expiration time (e.g., in minutes) of the JWT. In some aspects, this value is greater than zero and less than 1 hour. |

In some aspects, the data provider service 109 can enforce a re-authentication rule for communications with one or more of a user device 102 and a third-party system 104. In one example, if a scope of a given request from a browser application 103 is different than the scope of a previous request for the same user identifier 116, re-authentication of a user corresponding to the user identifier 116 may be required. In another example, if an OAuth token granted by the data provider service 109 expires, re-authentication of a user corresponding to the user identifier 116 may be required. In another example, if a JWT token used for communication with the data provider service 109 expires, re-authentication of a user corresponding to the user identifier 116 may be required.

Returning to FIG. 3, the data provider service 109 can respond to an authentication request (e.g., a POST command or other communication 320) by generating and transmitting an access token. For example, the telecommunications network server 108 can receive the communication 320 and, based on receiving the communication 320, perform operation 321 in which a short-term access token is generated. The telecommunications network server 108 can generate the access token using any suitable protocol (e.g., OAUTH2). The telecommunications network server 108 can specify a time-to-live (e.g., an expiration time) for the access token such that the access token can no longer be used to access features of the data provider service 109 after expiration of the access token. The telecommunications network server 108 can associate the access token with a user identifier for a particular user (e.g., by modifying a record in a suitable data structure to include data associating the user identifier with the access token). The telecommunications network server 108 can also associate the access token with one or more features in which the particular user is enrolled. In this manner, the access provided by the access token is limited to the enrolled features for the user. The access token can be a bearer token, where any entity in possession of the token can use the token to access the associated resources. In some aspects, the telecommunications network server 108 can also generate and transmit a refresh token along with the access token. A refresh token can include a request to renew the time-to-live associated with the access token. For example, the access token may have an expiration time of two minutes, after which the time-to-live expires and the access token can no longer be used to access features. In addition, the user may desire to use the access token (e.g., to access features) for longer than two minutes. The telecommunications network server 108 can generate a refresh token requesting an updated time-to-live, such as to avoid interrupting the user's session due to an expired access token.

The telecommunications network server 108 can transmit the generated access token to the third-party system 104 via a communication 322. The third-party system 104 can transmit the generated access token to the user device 102 via a communication 324. An example of a response 800 to the POST request is depicted in FIG. 8. The response 800 depicted in FIG. 8 includes an access token, an indication that the access token is a bearer token, a refresh token, an expiration time for the access token and the request token, and an identification of the scope authorized by the token.

The access token provided to the user device 102 can be used in subsequent API calls to the data provider API 110 that are performed by a browser application executed at the user device 102. For example, returning to FIG. 3, the user device 102 can transmit, to the telecommunications network server 108, a communication 326 that includes the short-term access token generated at operation 321 and a request to perform a feature in which the user is enrolled. For example, a browser application 103 executed at the user device 102 can include the access token in an authentication header of an API call to the data provider API 110. FIG. 9 depicts an example of a request 900 from the browser application 103 using an access token. The telecommunications network server 108 can receive, via the data provider API 110, the communication 326 having the access token and the request.

Returning to FIG. 3, the telecommunications network server 108 can verify, at operation 328, that the user identifier associated with the access token is enrolled in the feature. For example, the telecommunications network server 108 can execute the data service engine 112 (or other suitable program code) to perform operation 328. Operation 328 can include verifying that the access token has not expired. Operation 328 can also include retrieving, from a database or other suitable data structure, a user identifier that is associated with the access token. Operation 328 can also include identifying the enrolled features associated with the retrieved user identifier. Operation 328 can also include determining, based on a comparison of the request received in communication 326 and the identified features, that the user is enrolled in the requested feature.

At operation 330, the telecommunications network server 108 can perform the requested feature based on verifying that the user associated with the access token is enrolled in the feature. Performing the feature can involve retrieving data specific to the user from one or more user data records 118 (e.g., credit-related data about the user). In some aspects, performing the feature can also include deriving or otherwise generating output data specific to the user based on the retrieved data (e.g., generating a credit report from credit-related data about the user, computing a credit score from credit-related data about the user, etc.). The telecommunications network server 108 can output data to be provided to the user device 102 via the data provider API 110. The output data can include the data retrieved from the user data records 118, additional data derived from the retrieved data, or some combination thereof.

The telecommunications network server 108 can transmit the output data to the user device 102 via the communication 332. The communication 332 can be, for example, a response generated by the data provider API 110 that corresponds to an API call included in the communication 326 from the user device 102 to the telecommunications network server 108. FIG. 10 depicts an example of a response 1000 by the data provider service 109 to the request from the browser application 103.

Example of a Computing System for Browser Integration Operations

Figure 11:
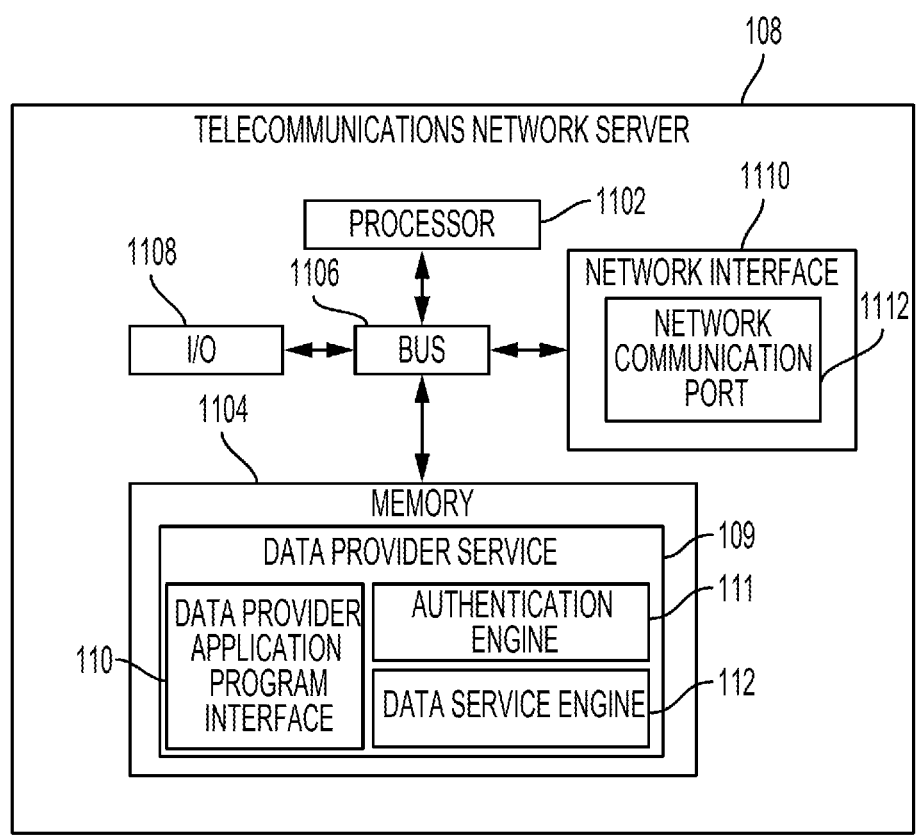
FIG. 11 is a diagram depicting an example of a telecommunications network server to perform operations for integrating data, according to certain aspects.

Any suitable computing system or group of computing systems can be used to perform the browser integration operations described herein. For example, FIG. 11 is a block diagram depicting an example of a telecommunications network server 108. The example of the telecommunications network server 108 can include various devices for communicating with other devices in the data service system 100, as described with respect to FIG. 1. The telecommunications network server 108 can include various devices for performing one or more browser integration operations described above with respect to FIGS. 1-10.

The telecommunications network server 108 can include a processor 1102 that is communicatively coupled to a memory 1104. The processor 1102 executes computer-executable program code stored in the memory 1104, accesses information stored in the memory 1104, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 1102 include a microprocessor, an application-specific integrated circuit, a field-programmable gate array, or any other suitable processing device. The processor 1102 can include any number of processing devices. The processor 1102 can include or communicate with a memory 1104. The memory 1104 stores program code that, when executed by the processor 1102, causes the processor to perform the operations described in this disclosure.

The memory 1104 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The telecommunications network server 108 may also include a number of external or internal devices such as input or output devices. For example, the telecommunications network server 108 is shown with an input/output interface 1108 that can receive input from input devices or provide output to output devices. A bus 1106 can also be included in the telecommunications network server 108. The bus 1106 can communicatively couple one or more components of the telecommunications network server 108.

The telecommunications network server 108 can execute program code that includes the authentication engine 111. The program code for the authentication engine 111 may be resident in any suitable computer-readable medium and may be executed on any suitable processing device. For example, as depicted in FIG. 11, the program code for the data provider service 109 (e.g., one or more of the data provider API 110, the authentication engine 111, and the data service engine 112) can reside in the memory 1104 at the telecommunications network server 108. Executing the data provider service 109 can configure the processor 1102 to perform the operations described herein with respect to FIGS. 1-10. In some aspects, one or more of the user identifiers 116 and the user data records 118 can also be stored in the memory 1104.

In some aspects, the telecommunications network server 108 can include a network interface device 1110. A network interface device 1110 can include any device or group of devices suitable for establishing a wired or wireless data connection to one or more data networks 106. Non-limiting examples of the network interface device 1110 include an Ethernet network adapter, a modem, etc. A network interface device 1110 can include one or more network communications ports 1112, where an address or other identifier of the communication port is used for communications with various client devices (e.g., a user device 102, a third-party system 104, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
a telecommunications network server comprising:
a processor,
a network communications port configured for being controlled by the processor and for communicating, via a data network, with a third-party system and a user device, and
a non-transitory computer-readable storage device included in or communicatively coupled to the telecommunication network server, the non-transitory computer-readable storage device comprising (i) a data provider service with a data provider application program interface ("API"), (ii) a data structure storing user data records with information about a user, and (iii) instructions that are executable by the processor to:
receive, via the network communications port and from the third-party system, an authentication API call addressed to an authentication endpoint of the data provider API, the authentication API call requesting an access token usable by a web-based application controlled by the third-party system,
determine, from a user identifier included in the authentication API call and that identifies the user, that the user is authorized to access one or more features of the data provider service,
generate the access token, wherein the access token is associated with the user identifier,
configure the network communications port to transmit the access token to the third-party system,
receive, via the network communications port and from the user device, a feature API call generated by an instance of the web-based application executed at the user device, the feature API call addressed to a feature endpoint of the data provider API,
generate, based on the feature API call including the access token and requesting performance of the one or more features, user-specific output data from the user data records by performing the one or more features, and
configure the network communications port to transmit the user-specific output data to the user device in a format displayable by the instance of the web-based application.

2. The system of claim 1, wherein the instructions are further executable by the processor to generate the user identifier by performing, prior to a receipt of the authentication API call, operations comprising:
receiving, via the network communications port and from the third-party system, an enrollment API call addressed to an enrollment endpoint of the data provider API, the enrollment API call requesting that the user be authorized to access the data provider service;
verifying an identity of the user based on (i) authentication data included in the enrollment API call and (ii) at least some of the information about the user from the user data records;
generating the user identifier; and
configuring the network communications port to transmit the user identifier to the third-party system.

3. The system of claim 2, wherein the enrollment API call further includes data authorizing the user to access an additional feature available from the data provider service.

4. The system of claim 1, wherein the instructions are further executable by the processor to:
   verify that the access token has not expired;
   determine that the access token is associated with the user identifier; and
   verify that the user identifier is associated with an authorization for the one or more features.

5. The system of claim 1, wherein the instructions are further executable by the processor to:
   determine that an additional user identifier included in an additional authentication API call does not match any user data record stored in the data structure; and
   responsive to determining that the additional user identifier does not match any user data record, configure the network communications port to transmit, to the third-party system, an error indicating a failure to authenticate an additional user associated with the additional user identifier.

6. The system of claim 1, wherein the processor is configured to determine that the user is authorized to access one or more features of the data provider service by performing operations comprising:
   determining a requested feature included in the authentication API call; and
   determining that the requested feature is in a set of enrolled features associated with the user identifier.

7. The system of claim 1, wherein:
   the authentication API call identifies a scope of operation of the data provider service,
   the one or more features are within the scope of operation, and
   the feature API call indicates that the access token has the scope of operation.

8. The system of claim 1, wherein generating the user-specific output data is responsive to determining that the one or more features are within a scope of operation associated with the access token.

9. A method comprising operations executed by one or more processing devices, the operations including:
   receiving, by a data provider service and via a data provider application program interface ("API"), an authentication API call addressed to an authentication endpoint of the data provider API, the authentication API call requesting an access token usable by a web-based application controlled by a third-party system from which the authentication API call is received;
   determining, from a user identifier in the authentication API call that identifies a user, that the user is authorized to access one or more features of the data provider service;
   generating the access token and associating the access token with the user identifier;
   transmitting the access token to the third-party system;
   receiving, by the data provider service and from a user device, a feature API call generated by an instance of the web-based application executed at the user device, the feature API call addressed to a feature endpoint of the data provider API;
   generating, based on the feature API call including the access token and requesting performance of the one or more features, user-specific output data from one or more user data records by performing the one or more features; and
   transmitting the user-specific output data to the user device in a format displayable by the instance of the web-based application.

10. The method of claim 9, the operations further including generating the user identifier by performing, prior to a receipt of the authentication API call, additional operations comprising:
    receiving, from the third-party system, an enrollment API call addressed to an enrollment endpoint of the data provider API, the enrollment API call requesting that the user be authorized to access the data provider service;
    verifying an identity of the user based on (i) authentication data included in the enrollment API call and (ii) information about the user from the user data records;
    generating the user identifier; and
    transmitting the user identifier to the third-party system.

11. The method of claim 9, the operations further including:
    verifying that the access token has not expired;
    determining that the access token is associated with the user identifier; and
    verifying that the user identifier is associated with an authorization for the one or more features.

12. The method of claim 9, the operations further including:
    determining that an additional user identifier included in an additional authentication API call does not match any user data record; and
    responsive to determining that the additional user identifier does not match any user data record, transmitting, to the third-party system, an error indicating a failure to authenticate an additional user associated with the additional user identifier.

13. The method of claim 9, wherein determining that the user is authorized to access one or more features of the data provider service includes:
    determining a requested feature included in the authentication API call; and
    determining that the requested feature is in a set of enrolled features associated with the user identifier.

14. The method of claim 9, wherein:
    the authentication API call identifies a scope of operation of the data provider service,
    the one or more features are within the scope of operation, and
    the feature API call indicates that the access token has the scope of operation.

15. A non-transitory computer-readable medium embodying program code for integrating authenticated user-specific output in a web-based application controlled by a third-party system, the program code comprising instructions which, when executed by a processor, cause the processor to perform operations including:
    receiving, by a data provider service with an application program interface ("API") and from the third-party system, an authentication API call addressed to an authentication endpoint of the data provider API, the authentication API call requesting an access token usable by a web-based application controlled by the third-party system;
    determining, from a user identifier included in the authentication API call and that identifies a user, that the user is authorized to access one or more features of the data provider service;
    generating the access token, wherein the access token is associated with the user identifier;
    transmitting the access token to the third-party system;
    receiving, by the data provider service and from a user device, a feature API call generated by an instance of the web-based application executed at the user device, the feature API call addressed to a feature endpoint of the data provider API;

generating, based on the feature API call including the access token and requesting performance of the one or more features, user-specific output data from one or more user data records by performing the one or more features; and transmitting the user-specific output data to the user device in a format displayable by the instance of the web-based application.

16. The non-transitory computer-readable medium of claim 15, the operations further including generating the user identifier by performing, prior to a receipt of the authentication API call, additional operations comprising:

receiving, from the third-party system, an enrollment API call addressed to an enrollment endpoint of the data provider API, the enrollment API call requesting that the user be authorized to access the data provider service;

verifying an identity of the user based on (i) authentication data included in the enrollment API call and (ii) information about the user from the user data records;

generating the user identifier; and transmitting the user identifier to the third-party system.

17. The non-transitory computer-readable medium of claim 15, the operations further including:

verifying that the access token has not expired;

determining that the access token is associated with the user identifier; and verifying that the user identifier is associated with an authorization for the one or more features.

18. The non-transitory computer-readable medium of claim 15, the operations further including:

determining that an additional user identifier included in an additional authentication API call does not match any user data record; and responsive to determining that the additional user identifier does not match any user data record, transmitting, to the third-party system, an error indicating a failure to authenticate an additional user associated with the additional user identifier.

19. The non-transitory computer-readable medium of claim 15, wherein determining that the user is authorized to access one or more features of the data provider service includes:

determining a requested feature included in the authentication API call; and determining that the requested feature is in a set of enrolled features associated with the user identifier.

20. The non-transitory computer-readable medium of claim 15, wherein generating the user-specific output data is responsive to determining that the one or more features are within an operation scope associated with the access token.

* * * * *